US006985518B2

(12) United States Patent
Nielsen (10) Patent No.: US 6,985,518 B2
(45) Date of Patent: Jan. 10, 2006

(54) ADAPTIVE GENERALIZED MATCHED FILTER RAKE RECEIVER SYSTEM AND METHOD

(75) Inventor: Jorgen S. Nielsen, Calgary (CA)

(73) Assignee: Research In Motion Limited, Waterloo (CA)

(*) Notice: Subject to any disclaimer, the term of this patent is extended or adjusted under 35 U.S.C. 154(b) by 805 days.

(21) Appl. No.: 10/017,158

(22) Filed: Dec. 14, 2001

(65) Prior Publication Data
US 2002/0080863 A1 Jun. 27, 2002

Related U.S. Application Data

(60) Provisional application No. 60/257,737, filed on Dec. 22, 2000.

(51) Int. Cl.
*H04B 1/707* (2006.01)
*H04B 7/02* (2006.01)
(52) U.S. Cl. ................. 375/152; 375/343; 375/348
(58) Field of Classification Search ........... 375/130, 375/140, 147, 316, 343, 346, 347, 348, 150, 375/151, 152
See application file for complete search history.

(56) References Cited

U.S. PATENT DOCUMENTS 5,917,851 A * 6/1999 Jarvela et al. ............... 375/148
6,067,293 A * 5/2000 Shoji ........................... 370/342
6,069,912 A * 5/2000 Sawahashi et al. .......... 375/142
6,192,066 B1 * 2/2001 Asanuma ..................... 375/130
6,208,683 B1 * 3/2001 Mizuguchi et al. .......... 375/140
6,304,750 B1 * 10/2001 Rashid-Farrokhi et al. . 455/137
6,507,604 B1 * 1/2003 Kuo ............................ 375/148

OTHER PUBLICATIONS

A Generalized RAKE Receiver for Interference Suppression, Gregory E. Bottomley, et al., IEEE Journal on Selected Areas in Communications, vol. 18, No. 8, Aug. 2000 (pp. 1536-1545).

* cited by examiner

Primary Examiner—Chieh M. Fan
Assistant Examiner—Jason M. Perilla
(74) Attorney, Agent, or Firm—Jones Day; Krishna K. Pathiyal; Robert C. Liang (57) ABSTRACT

An adaptive generalized matched filter (AGMF) rake receiver system includes a rake receiver and an AGMF weight determination module. The rake receiver is coupled to a spread spectrum input signal and applies a vector of weight signals to the spread spectrum input signal to compensate for dependant noise and generate a decision variable. The AGMF weight determination module monitors the decision variable and generates the vector of weight signals, wherein optimal values for the vector of weight signals are calculated by the AGMF weight determination module by varying the vector of weight signals until the signal to noise ratio of the decision variable reaches a peak value

20 Claims, 6 Drawing Sheets

ADAPTIVE GENERALIZED MATCHED FILTER RAKE RECEIVER SYSTEM AND METHOD

CROSS-REFERENCE TO RELATED APPLICATION

This application claims priority from and is related to the following prior application: Adaptive Generalized Matched Filter Rake Receiver System And Method, U.S. Provisional Application No. 60/257,737, filed Dec. 22, 2000. This prior application, including the entire written description and drawing figures, is hereby incorporated into the present application by reference.

BACKGROUND

1. Field of the Invention

This invention relates generally to the field of spread spectrum rake receivers. More particularly, an Adaptive Generalized Matched Filter rake receiver system and method is provided that is especially well suited for use in a mobile communication device.

2. Description of the Related Art

Mobile communication devices operate in a multi-path propagation environment, i.e., there is typically more than one propagation path from the transmitter to the receiver. In addition, the velocity of the mobile device may vary from 0 km/h (standing still) to 500 km/h (traveling in a high speed train). Therefore, the multi-path propagation environment will typically range from direct line of sight to multi-clustered, multi-path propagation with no direct line of sight spread over several microseconds. Consequently, typical mobile communication devices employ a multi-fingered rake receiver that uses simple Maximal Ratio Combining and standard pilot tracking processing in order to track the centroids of the multi-path clusters in a spread spectrum signal, such as a Code Division Multiple Access (CDMA) signal.

A typical Maximal Ratio Combining (MRC) rake receiver includes a plurality of fingers, each of which correlates to a different delay of an input signal. The correlator outputs from each finger are then typically weighted by a vector of complex weighting coefficients, and combined to form a decision variable. In typical MRC rake receivers, the values of the coefficients in the weighting vector are chosen without regard to the statistical correlation properties of the noise impairment in the received signal, for instance by setting each weighting coefficient as the complex conjugate of the channel impulse response. As a result, typical MRC rake receivers perform optimally when the noise corruption to the input signal is limited to Independent Additive Noise (IAN), such as Additive White Gaussian Noise (AWGN), which is independent of the signal transmitted to the mobile device from a base station. In typical mobile communication systems, however, multiple spread spectrum signals are transmitted at a single bandwidth, resulting in dependant noise, such as Multi-User Interference (MUI). Because typical MRC rake receivers are optimized to compensate for IAN, they are often sub-optimal when dependent noise is present.

The use of a Generalized Matched Filter (GMF) to compensate for dependant noise in a spread spectrum signal is known. For instance, a generic description of a GMF is found in Kay, "Fundamentals of statistical signal processing—detection theory," Prentice Hall, 1998. In addition, the use of a GMF in a CDMA receiver is disclosed in G. Bottomly et al, "A generalized Rake receiver for interference suppression," IEEE Journal on selected areas in communications, Vol. 18, No.8, August 2000. Known Generalized Matched Filters, however, require an excessive amount of processing, and are therefore not typically implemented in mobile communication devices.

SUMMARY

An Adaptive Generalized Matched Filter (AGMF) rake receiver system includes a rake receiver and an AGMF weight determination module. The rake receiver is coupled to a spread spectrum input signal and applies a vector of weight signals to the spread spectrum input signal to compensate for dependant noise and to generate a decision variable. The AGMF weight determination module monitors the decision variable and generates the vector of weight signals, wherein optimal values for the vector of weight signals are calculated by the AGMF weight determination module by varying the vector of weight signals until the signal to noise ratio of the decision variable reaches a peak value.

DETAILED DESCRIPTION

Figure 1:
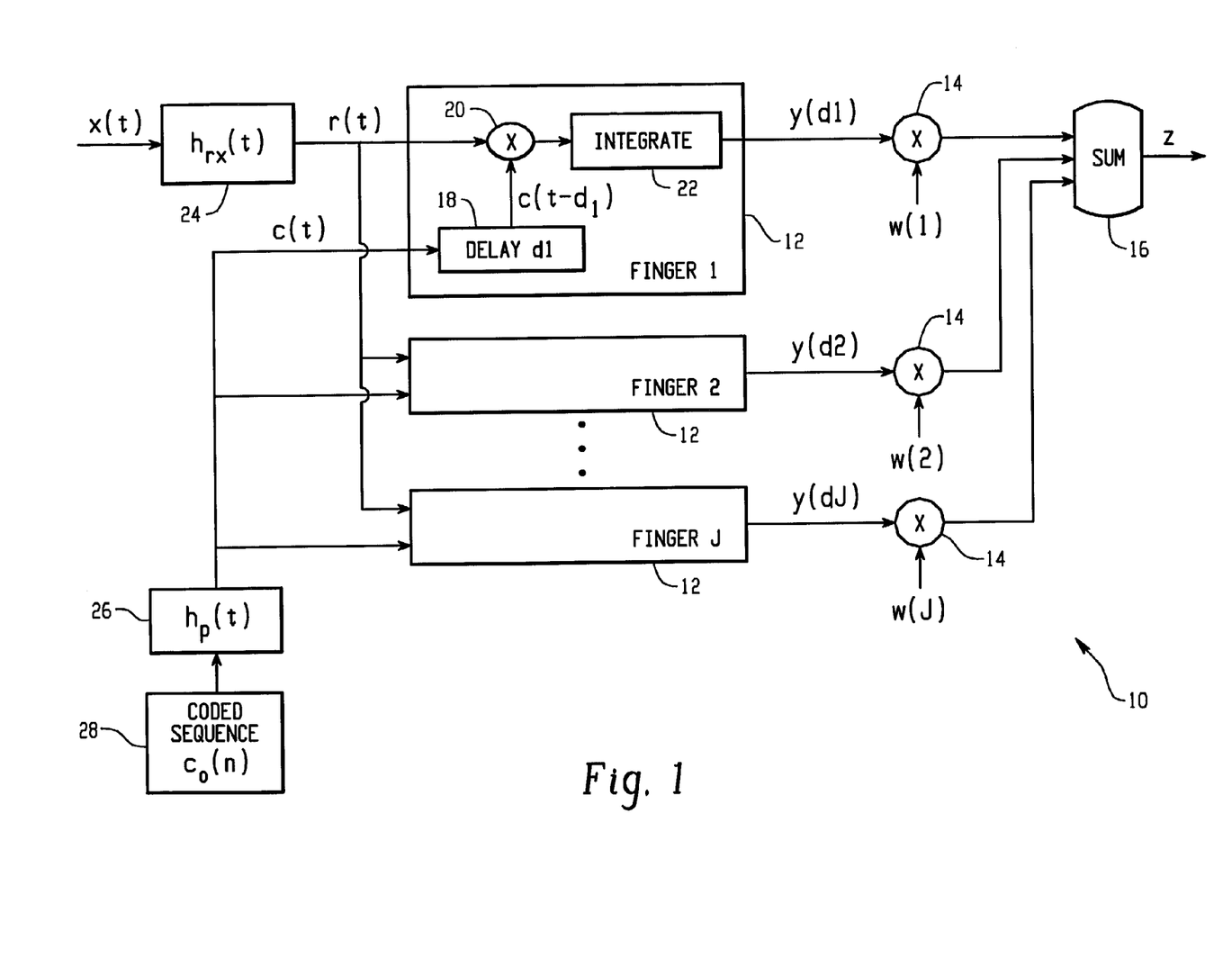
FIG. 1 is a block diagram of an exemplary rake receiver for use in an Adaptive Generalized Matched Filter (AGMF) rake receiver system.

Referring now to the drawing figures, FIG. 1 is a block diagram of an exemplary rake receiver 10 for use in an Adaptive Generalized Matched Filter (AGMF) rake receiver system. The rake receiver 10 includes a plurality of correlator fingers 12, a plurality of weight multipliers 14, and an adder 16. Each correlator finger 12 includes a delay element 18, a multiplier 20 and an integrator 22. Also shown is a receiver chain impulse response block 24, a pulse shaping filter 26 and a coded sequence $c_o(n)$ block 28.

A multi-path, spread spectrum signal x(t), such as a CDMA signal, is received by the mobile communication device, and is filtered by the receiver chain impulse response block $h_{rx}(t)$ 24 to generate a demodulated base-band input signal r(t) to the rake receiver 10. The receiver chain impulse response block $h_{rx}(t)$ 24 represents the combined filter responses in the receiver chain prior to the rake receiver 10, such as the responses from an RF filter, band limiting components, an IF filter, and DSP filtering blocks. The input signal r(t) to the rake receiver 10 is coupled to one input of the multiplier 20 in each correlator finger 12.

Each correlator finger 12 also receives a despreading signal c(t), which is formed by convolving the coded sequence $c_o(n)$ 28 for the desired traffic channel (n is the chip index) with the impulse response $h_p(t)$ of the pulse shaping filter 26. The impulse response $h_p(t)$ may be a single impulse or a rectangular pulse, depending upon how the correlation function is implemented. Each correlator finger 12 is represented with an index number 1, 2, . . . ,J. Operationally, each correlator finger 12 is substantially the same as the first, which will be described next in greater detail. A delay element ($d_1$) 18 is then applied to the despreading signal c(t) within each correlation finger 12 in order to generate a shifted despreading signal $c(t-d_1)$ that is aligned with one channel of the multi-path input signal r(t). The shifted despreading signal $c(t-d_1)$ is coupled to a second input of the multiplier 20. The multiplier 20 performs a complex operation on the input signal r(t) and the shifted despreading signal $c(t-d_1)$, forming the product $c(t-d_1)*r(t)$, where '*' denotes the complex conjugate operation. The output of the multiplier 20 is then coupled to the integrator 22 in order to correlate the signals over some period of time and to generate a correlation output $y(d_1)$. The other correlator fingers 12 operate in substantially the same way as described above, except that delay $d_1$ is substituted with delay $d_2, \ldots, d_J$ for each of the other correlator fingers 12.

If the propagation channel of the input signal r(t) were ideal, i.e. a single-path environment with no noise, then the rake receiver 10 would only require one correlation finger 12 and a single delay element $d_1$. In this ideal case, the delay element $d_1$ would be calculated such that the shifted despread signal $c(t-d_1)$ would align exactly with a pilot signal within r(t), satisfying the equation:

$$h_1 c(t-d_1) = r(t),$$

where $h_1$, in this ideal case, is a single complex constant. Then, assuming that the correlation epoch is appropriately chosen, the correlation output $y(d_1)$ reasonably approximates $h_1$. Thus, the correlation output $y(d_1)$ is an estimate of the channel impulse response of the complete link from the transmitter to the receiver.

In a true multi-path environment, however, the channel impulse response from the transmitter to the receiver is represented by a series of impulses of amplitudes $\{h_1, h_2, \ldots, h_J\}$, designated hereinafter by the vector $\vec{h}$. Thus, a series of delays $\{d_1, d_2, \ldots, d_J\}$, represented hereinafter by the delay vector $\vec{d}$, should be calculated for the array of correlation fingers 12, resulting in an array of correlator outputs $\{y(d_1), y(d_2), \ldots, y(d_J)\}$. When the delay vector $\vec{d}$ is applied to a traffic-carrying input signal r(t), the array of correlator outputs may be approximated as follows:

$$y(d_1) = S h_1$$
$$y(d_2) = S h_2$$
$$\ldots$$
$$y(d_J) = S h_J,$$

where S is an unknown complex amplitude coefficient that reflects the data content of the input signal r(t).

In order to estimate the value of the coefficient S, the correlator outputs are weighted by a vector $\vec{w}$ of complex weight signals $\{w_1, w_2, \ldots, w_J\}$ in the weight multipliers 14. The outputs from the weight multipliers 14 are combined in the adder 16 to generate a decision variable z which is proportional to the complex amplitude coefficient S by a real constant of proportionality. A system and method for deriving optimal values for the weight signals $\{w_1, w_2, \ldots, w_J\}$ is discussed in detail below with reference to FIGS. 2–6.

Figure 2:
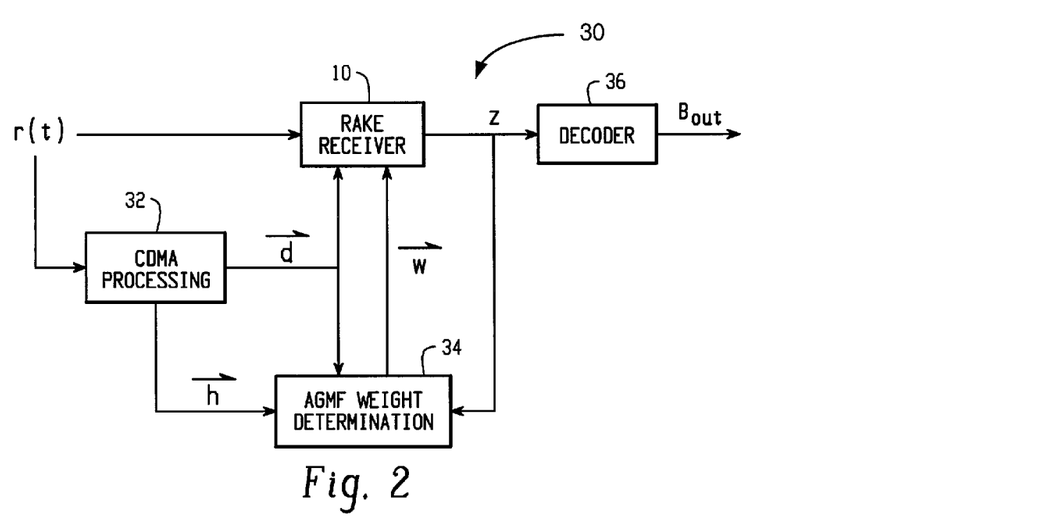
FIG. 2 is a block diagram of an exemplary AGMF rake receiver system.

FIG. 2 is a block diagram of an exemplary AGMF rake receiver system 30. The system 30 includes the rake receiver 10, a CDMA processing module 32, an AGMF weight determination module 34, and a decoder 36. The CDMA processing module 32 and the AGMF weight determination module 34 respectively calculate the delay $\vec{d}$ and weight signal $\vec{w}$ vectors used by the rake receiver 10. The CDMA processing module 32 and the AGMF weight determination module 34 are preferably software modules executing on a processing unit, such as a microprocessor, a field programmable gate array (FPGA), a digital signal processor, or a software interpreter module. It should be understood, however, that the exemplary AGMF rake receiver system 30 is not limited to an embodiment having independent software modules for the CDMA processing module 32 and the AGMF weight determination module 34. Rather, the functions of the CDMA processing module 32 and the AGMF weight determination module 34 may be performed by a plurality of separate software modules, by the same software module, or by some other processing means.

The CDMA processing module 32 receives the demodulated base-band input signal r(t) as an input, and calculates the channel impulse response $\vec{h}$ and the delay vector $\vec{d}$. The CDMA processing module 32 tracks the CDMA forward-link pilot channel and measures the impulse response $\vec{h}$ of the propagation channel. Contained in this impulse response $\vec{h}$ are the resolvable multi-path clusters or components $\{h_1, h_2, \ldots, h_J\}$ that are tracked in order to calculate the delay vector $\vec{d}$, which is applied to the traffic-carrying input signal r(t) in the rake receiver 10. It should be understood, however, that alternative processing modules may be utilized in place of the CDMA processing module 32 that are configured for standards other than the CDMA standard.

Figure 3:
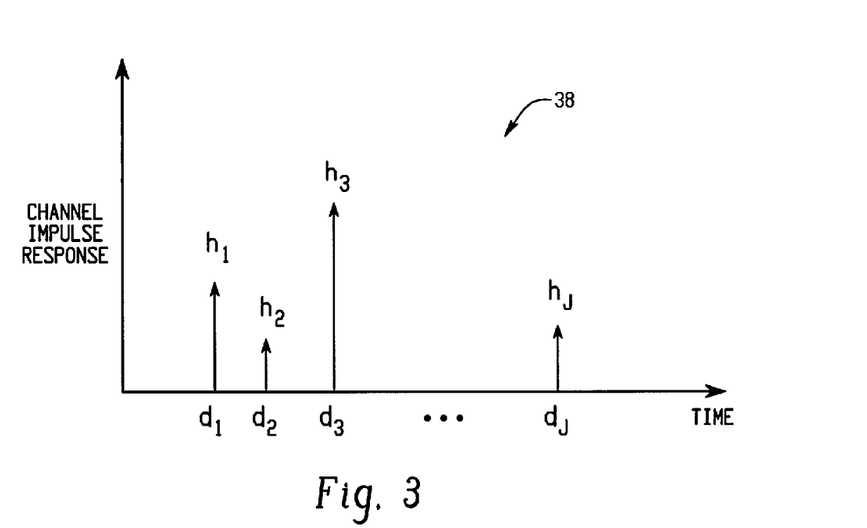
FIG. 3 is a graph plotting exemplary multi-path components $\{h_1, h_2, \ldots, h_J\}$ of the channel impulse response $\vec{h}$ as a function of time.

FIG. 3 is a graph 38 plotting exemplary multi-path components $\{h_1, h_2, \ldots, h_J\}$ of the channel impulse response $\vec{h}$ as a function of time. This graph 38 illustrates that by tracking the multi-path components $\{h_1, h_2, \ldots, h_J\}$ of the channel impulse response $\vec{h}$, the CDMA processor module 32 may calculate the delays $\{d_1, d_2, \ldots, d_J\}$ between the multi-path clusters of the input signal r(t).

Referring again to FIG. 2, the AGMF weight determination module 34 receives the channel impulse response $\vec{h}$ and the delay vector $\vec{d}$ from the CDMA processing module 32 and a feed-back decision variable z from the rake receiver 10, and generates the vector of weight signals $\vec{w}$. A detailed description of the AGMF weight determination module 34 is provided below with reference to FIGS. 4 and 5.

An embodiment of the rake receiver 10 is described above with reference to FIG. 1. It should be understood, however, that the rake receiver 10 described above with reference to FIG. 1 is just one possible embodiment, and may be replaced with the Dual Decision Statistic Pilot Rake Receiver 70 described below with reference to FIG. 6, or with other rake receiver designs.

The decision variable output z from the rake receiver 10 is also coupled as an input to the decoder 36, which converts the decision variable z into a binary receiver output $B_{out}$. The decoder 36 is preferably chosen based on the type of modulation scheme expected in the input signal r(t). For instance, the CDMA, DS-CDMA and UTMS standards typically employ quadrature amplitude modulation (QAM) schemes, while other standards, such as the GSM and GPRS standards, typically employ GMSK modulation.

Figure 4:
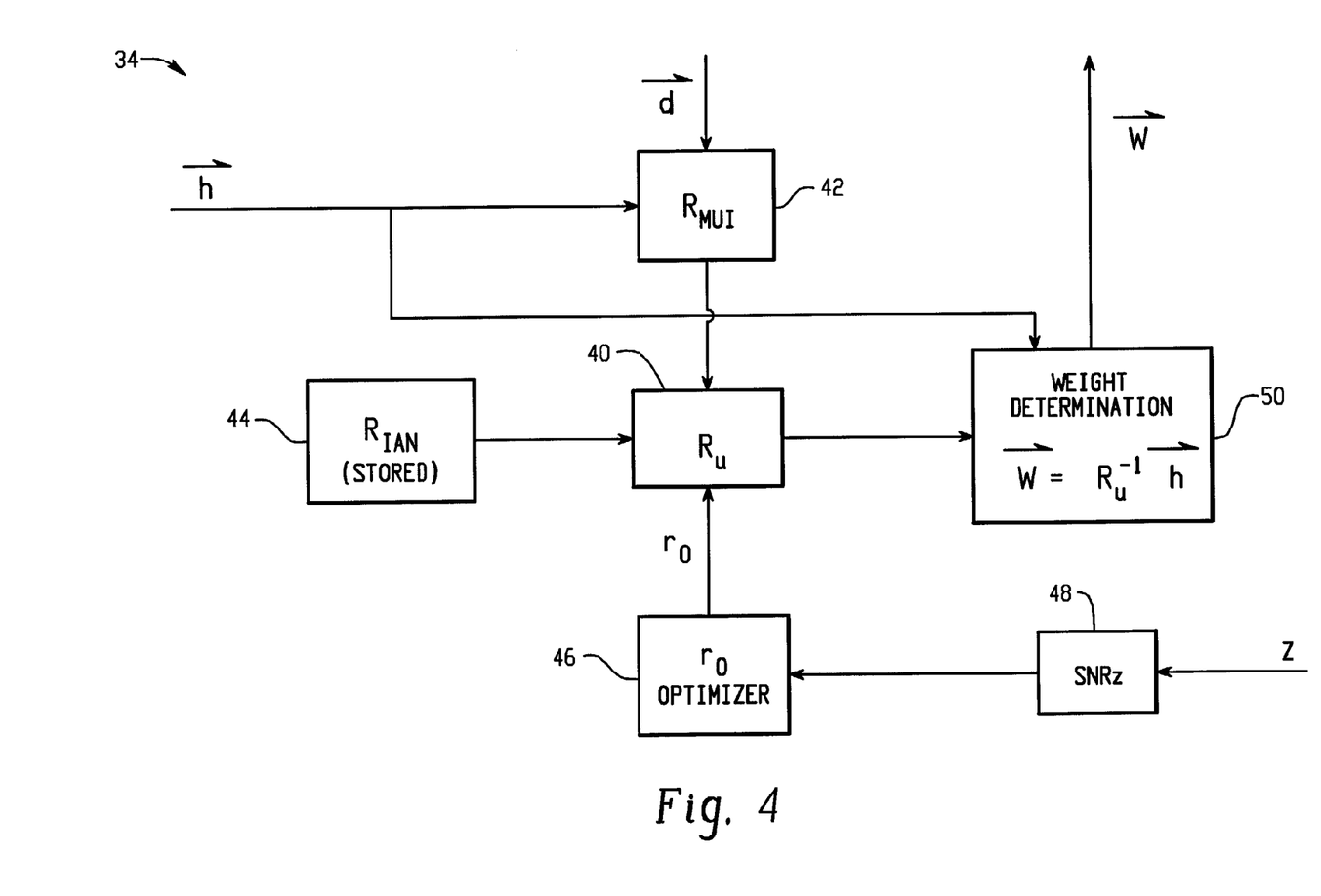
FIG. 4 is a more detailed block diagram of the AGMF Weight Determination module shown in FIG. 2.

FIG. 4 is a more detailed block diagram of the AGMF Weight Determination module 34 shown in FIG. 2. The AGMF Weight Determination module 34 preferably includes various sub-modules, including a total noise covariance matrix $R_u$ module 40, a dependent noise covariance matrix $R_{DEP}$ module 42, an independent noise covariance matrix $R_{IND}$ module 44, an optimizer module 46, a signal-to-noise ratio (SNR) module 48 and a weight determination module 50. These sub-modules may be independent software modules or sub-routines within the CDMA processing module 32, or may be realized by some alternative programming structure or processing device. The various sub-modules 40–50 are used by the AGMF Weight Determination module 34 to calculate the optimal weight signals $\vec{w}_{opt}$.

With reference to FIG. 1, the vector $\vec{Y}$ of rake correlator outputs $\{y(d_1), y(d_2), \ldots y(d_J)\}$ may be modeled by the linear relation:

$$\vec{Y} = \vec{h} + \vec{U}$$

where $\vec{U}$ is a noise vector. In order to achieve an optimal SNR for the decision variable z, the weight signals $\vec{w}$ should be calculated according to the following equation:

$$\vec{w}_{opt} = R_u^{-1} \vec{h}$$

where $R_u$ is the total noise covariance matrix for the noise vector $\vec{U}$.

The noise vector $\vec{U}$ includes two relative components for the purposes of the AGMF Weight Determination module 34: an independent noise component, $U_{IND}$, and a dependent noise or multi-user interference (MUI) component, $U_{DEP}$. Thus, the noise vector $\vec{U}$ may be expressed as:

$$\vec{U} = \vec{U}_{IND} + \vec{U}_{DEP}.$$

The covariance matrix of $\vec{U}$ can be expressed by the superposition of the covariance matrices of its two components. The covariance matrix of $\vec{U}_{IND}$ is $R_{IND}$, and the covariance matrix of $U_{DEP}$ is $R_{DEP}$, therefore the covariance matrix of $\vec{U}$ can be expressed:

$$R_u = r_o R_{DEP} + (1-r_o) R_{IND}, \text{ where } r_o \text{ is a scalar in the range } 0 \leq r_o$$

The optimal value for $r_o$ may then be found using a single scalar feedback loop, as described below.

Referring again to FIG. 4, the independent noise covariance matrix $R_{IND}$ and the dependent noise covariance matrix $R_{DEP}$ are established by the independent noise covariance matrix sub-module 44 and the dependent noise covariance matrix sub-module 42, respectively. The independent noise covariance matrix $R_{IND}$ is preferably calculated during the manufacture of the mobile device receiver and stored within a memory device accessible by the AGMF Weight Determination module 34. For instance, if the independent noise of concern is limited to Additive White Gaussian Noise, then the impulse response of the receiver during manufacture will yield the independent noise covariance matrix $R_{IND}$. The dependent noise covariance matrix $R_{DEP}$ is preferably calculated during operation of the mobile device by monitoring the channel impulse response $\vec{h}$ and the delay vector $\vec{d}$. Various methods for calculating the independent and dependant noise covariance matrices are known, and should be apparent to those skilled in the art.

The independent noise covariance matrix $R_{IND}$ and the dependant noise covariance matrix $R_{DEP}$ are provided as inputs to the total noise covariance matrix sub-module 40 to establish two components of $R_u$. The scalar parameter $r_o$ is established by the optimizer module 46, and is provided as a third input to the total noise covariance matrix sub-module 40. In a preferred embodiment, the optimizer module 46 determines the optimal value for $r_o$ by first choosing an arbitrary or estimated value for $r_o$, and then incrementing or decrementing $r_o$ until a feedback signal, such as the SNR of the decision variable z, reaches its peak or optimal value. An exemplary method for calculating the optimal value for $r_o$ using the SNR of the decision variable z is described below with reference to FIGS. 5–7. It should be understood, however, that the scalar parameter $r_o$ could alternatively be calculated by monitoring some other feedback parameter, such as the bit error rate of the decision variable z, that indicates when the weight signals $\vec{w}$ are optimal.

The weight determination sub-module 50 receives the total noise covariance matrix $\vec{R}_u$ and the channel impulse response $\vec{h}$, and calculates the weight signal vector $\vec{w}$ according to the equation described above. The weight signal vector $\vec{w}$ is then coupled as an input to the rake receiver 10, and settles to its optimal value, $\vec{w}_{opt}$, as the scalar parameter $r_o$ is incremented or decremented by the optimizer module 46.

Figure 5:
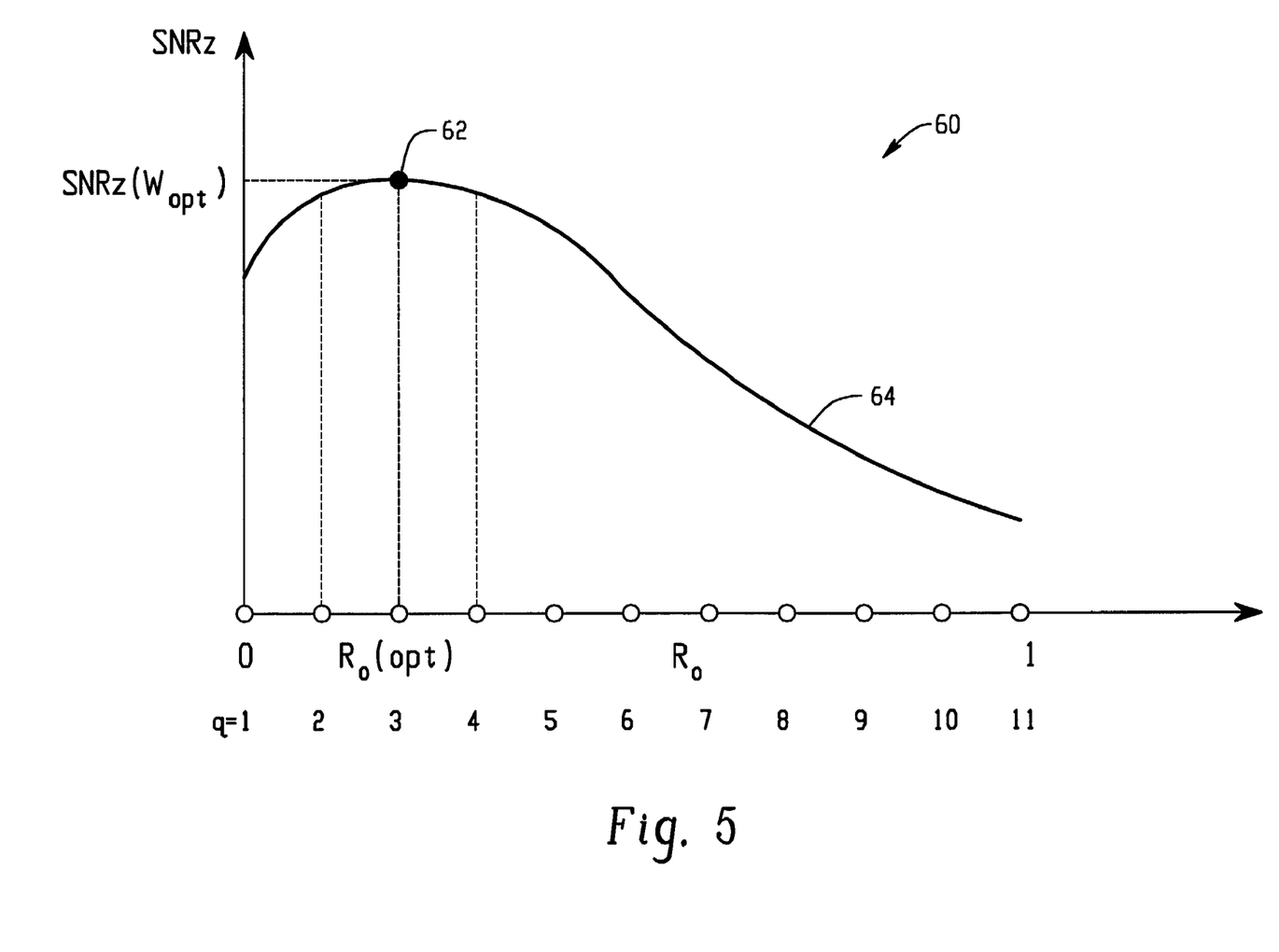
FIG. 5 is a graph plotting the SNR of the decision variable output z from the rake receiver as a function of the scalar parameter $r_o$.

FIG. 5 is a graph 60 plotting the SNR of the decision variable output z from the rake receiver 10, SNRz, as a function of the scalar parameter $r_o$. SNRz is represented along the y-axis of the graph 60, and the incremental values of $r_o$, between zero (0) and one (1), are shown along the x-axis. The peak SNRz 62 corresponding to the optimal weight signal vector $\vec{w}_{opt}$ appears at the apex of the plotted curve 64 and corresponds to the optimal value for $r_o$. In this embodiment, the range of $r_o$ is divided into eleven (11) discrete values, $\{0, 0.1, 0.2, 0.3, \ldots, 1.0\}$, which are identified on the x-axis of the graph 60 by eleven points or states q that are labeled $\{1, 2, 3, \ldots, 11\}$. The eleven (11) discrete values of $r_o$ are therefore referred to hereinafter as states one (1) through eleven (11). In alternative embodiments, the precision of the optimizer module 46 could be increased or decreased by varying the number of states.

Cross-referencing FIGS. 4 and 5, the SNR module 48 calculates SNRz for the current state q, which the optimizer module 46 preferably stores at a memory location on the device. The optimizer module 46 then increments or decrements the current state q, and compares the new SNRz with the stored value. In one alternative embodiment, two consecutive states of the SNRz may be calculated simultaneously by using a Dual Decision Statistic Pilot Rake Receiver 70 as described below with reference to FIG. 6. In either case, if the SNRz of the new state is greater than the SNRz of the current state, then the optimizer module 46 sets the new state as the current state. This process may be repeated until the SNRz reaches its peak value 62 in order to achieve the optimal value for $r_o$. This method for determining the optimal value for $r_o$ is described below in more detail with reference to FIG. 7.

Figure 6:
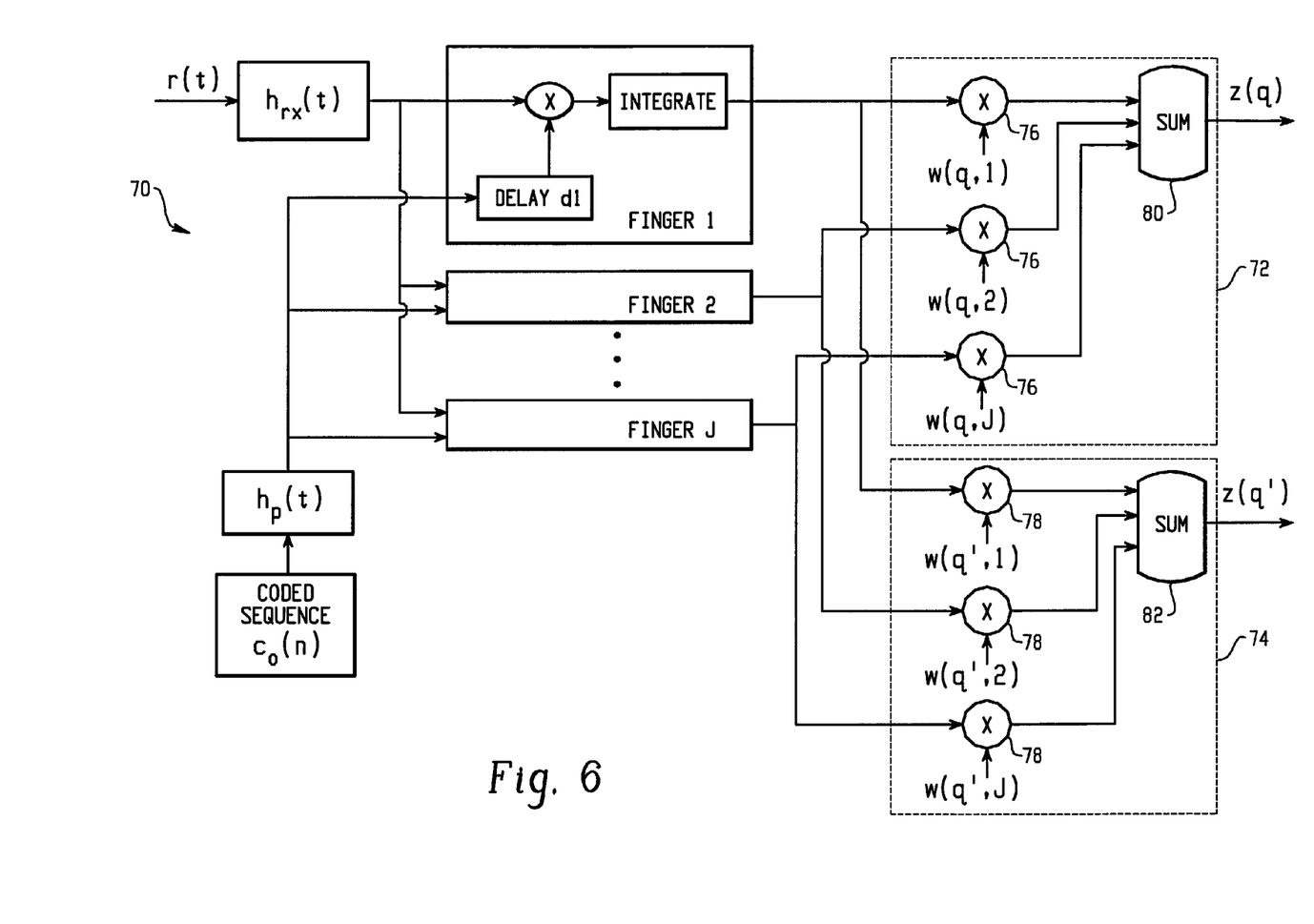
FIG. 6 is a block diagram of an exemplary Dual Decision Statistic Pilot Rake Receiver.

FIG. 6 is a block diagram of an exemplary Dual Decision Statistic Pilot Rake Receiver 70. This rake receiver 70 could be used, for example, to simultaneously provide two states of the decision variable output, z(q) and z(q'). This rake receiver 70 is similar to the rake receiver 10 described above with reference to FIG. 1, except the array of correlator outputs $\{y(d_1), y(d_2), \ldots, y(d_J)\}$ are coupled to two output stages 72, 74. Each output stage 72, 74 includes a plurality of weight multipliers 76, 78 and an adder 80, 82. The weight multipliers 76 in one output stage 72 are coupled to a first vector of weight signals $\vec{w}(q)$ corresponding to a first state q, and the weight multipliers 78 in the second output stage 74 are coupled to a second vector of weight signals $\vec{w}(q')$ corresponding to a second state q'. The outputs from the weight multipliers 76, 78 are coupled to the adders 80, 82 in their respective output stages 72, 74, thus generating the two states of the decision variable output, z(q) and z(q').

Figure 7:
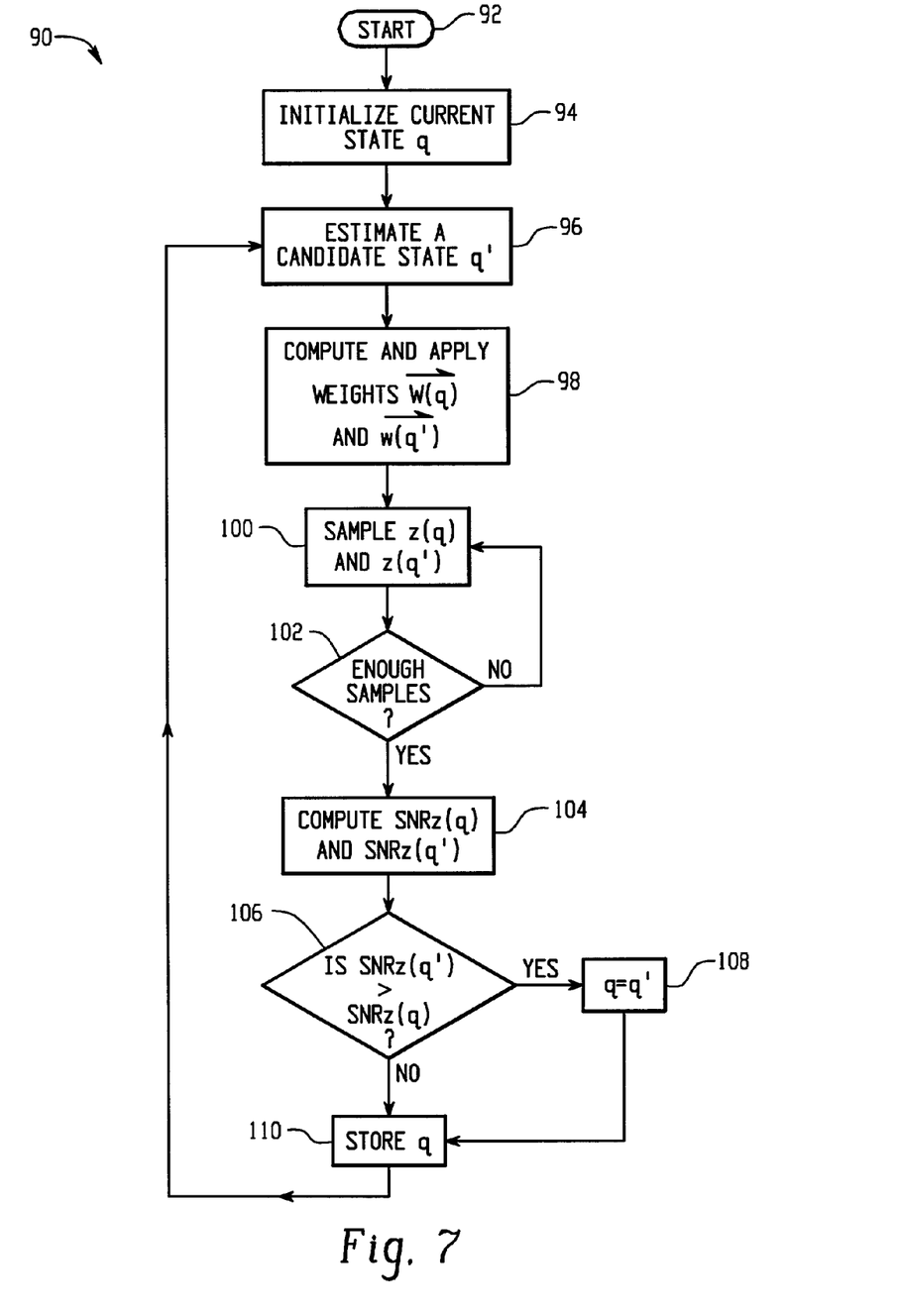
FIG. 7 is a flow diagram illustrating an exemplary method for calculating the optimal weight signal vector $\vec{w}_{opt}$.

FIG. 7 is a flow diagram illustrating an exemplary method for calculating the optimal weight signal vector $\vec{w}_{opt}$. The method begins at step 92. In step 94, a current state value q is initialized. The initial value for q may, for example, be set zero, to some pre-selected estimate, or to any other value within the range of state values. Then, in step 96, a candidate state q' is estimated based on the current state q. The estimation for q' may, for example, be achieved by alternately selecting the state below and above the current state q each time the method 90 is repeated. For instance, in one pass through the method 90, the candidate state q' may be set to q+1, and then in the next pass the candidate state q' may be set to q−1. In another embodiment, the current state q could be initialized at either the highest or lowest state value, and then incremented or decremented each time each time the method 90 is repeated.

In step 98, two weight signal vectors $\vec{w}(q)$ and $\vec{w}(q')$ are calculated, as described above, with $\vec{w}(q)$ corresponding to the current state and $\vec{w}(q')$ corresponding to the candidate state. In an embodiment utilizing the Dual Decision Statistic Pilot Rake Receiver 70 or a similar rake receiver, the two weight vectors $\vec{w}(q)$ and $\vec{w}(q')$ may be calculated simultaneously. In other embodiments, however, the weight vectors $\vec{w}(q)$ and $\vec{w}(q')$ may be calculated in succession using a rake receiver with a single output stage, such as the rake receiver described above with reference to FIG. 1.

Once the weight vectors $\vec{w}(q)$ and $\vec{w}(q')$ have been calculated and applied to a rake receiver, the current and candidate decision statistics z(q) and z(q') are sampled from the output of the rake receiver. Similar to the weight vector calculation described in step 98, the decision statistics z(q) and z(q') may be sampled simultaneously or successively, depending upon the type of rake receiver. Once a sufficient number of samples have been calculated such that the SNRz may be calculated with statistical significance (step 102), the current and candidate SNRz(q) and SNRz(q') are calculated in step 104.

If the current SNRz(q) is greater than the candidate SNRz(q') (step 106), then the current state q is set to the candidate state q' (step 108). Then, in step 110, the current state q is stored, and the method repeats at step 96.

This written description uses examples to disclose the invention, including the best mode, and also to enable any person skilled in the art to make and use the invention. The patentable scope of the invention is defined by the claims, and may include other examples that occur to those skilled in the art.

I claim:

1. An Adaptive Generalized Matched Filter (AGMF) rake receiver system, comprising:
a rake receiver coupled to a spread spectrum input signal that applies a vector of weight signals ($\vec{w}$) to the spread spectrum input signal to compensate for dependant noise and generates a decision variable; and
an AGMF weight determination module that monitors the decision variable and generates the vector of weight signals, wherein optimal values for the vector of weight signals ($\vec{w}$) are calculated by the AGMF weight determination module by varying the vector of weight signals until a signal-to-noise ratio of the decision variable reaches a peak value;
wherein the AGMF weight determination module monitors two consecutive states of the decision variable in order to determine when the signal-to-noise ratio of the decision variable is at the peak value;
wherein the AGMF weight determination module simultaneously generates a first ($\vec{w}(q)$) and a second ($\vec{w}(q')$) vector of weight signals, each vector of weight signals corresponding respectively to one of the two consecutive states of the decision variable, and wherein the rake receiver comprises:
a plurality of correlator fingers that receive the spread spectrum input signal and apply a despreading signal to generate a plurality of correlation output signals;
a first output stage that applies the first vector of weight signals to the plurality of correlation output signals and generates a first consecutive state of the decision variable; and
a second output stage that applies the second vector of weight signals to the plurality of correlation output signals and generates a second consecutive state of the decision variable.

2. The AGMF rake receiver system of claim 1, wherein the AGMF weight determination module is one or more software modules operating on a processing unit.

3. The AGMF rake receiver system of claim 1, further comprising:

a decoder coupled to the decision variable that generates a binary output.

4. The AGMF rake receiver system of claim 1, wherein the spread spectrum input signal is a Code Division Multiple Access (CDMA) signal.

5. The AGMF rake receiver system of claim 4, further comprising:
a CDMA processing module coupled to the spread spectrum input signal that tracks a pilot channel in the spread spectrum input signal and generates a vector of delay elements ($\vec{d}$) that are coupled to the rake receiver, wherein the rake receiver uses the vector of delay elements ($\vec{d}$) to despread a plurality of multi-path clusters of the spread spectrum input signal.

6. The AGMF rake receiver system of claim 5, wherein the CDMA processing module is one or more software modules operating on a processing unit.

7. The AGMF rake receiver system of claim 5, wherein:
the vector of delay elements ($\vec{d}$) is also coupled to the AGMF weight determination module;
the CDMA processing module also generates a vector of channel impulse response signals ($\vec{h}$) that are coupled to the AGMF weight determination module;
the vector of channel impulse response signals ($\vec{h}$), the vector of delay elements ($\vec{d}$) and the signal-to-noise ratio of the first consecutive state of the decision variable are used by the AGMF weight determination module to calculate a first total noise covariance matrix ($Ru_1$), and wherein the first vector of weight signals ($\vec{w}(q)$) is calculated using the equation $\vec{w}(q)=Ru_1^{-1}\vec{h}$; and
the vector of channel impulse response signals ($\vec{h}$), the vector of delay elements ($\vec{d}$) and the signal-to-noise ratio of the second consecutive state of the decision variable are used by the AGMF weight determination module to calculate a second total noise covariance matrix ($Ru_2$), and wherein the second vector of weight signals ($\vec{w}(q')$) is calculated using the equation $\vec{w}(q')=Ru_2^{-1}\vec{h}$.

8. The AGMF rake receiver system of claim 7, wherein the total noise covariance matrixes each have an independent noise component and a dependent noise component.

9. The AGMF rake receiver system of claim 8, wherein the independent noise component of the total noise covariance matrixes are stored in a memory device and retrieved by the AGMF weight determination module.

10. The AGMF rake receiver system of claim 8, wherein the dependent noise component of the total noise covariance matrixes are calculated by the AGMF weight determination module using the vector of delay elements ($\vec{d}$) and the vector of channel impulse response signals ($\vec{h}$).

11. The AGMF rake receiver system of claim 1, wherein the rake receiver comprises:
a plurality of correlator fingers that receive the spread spectrum input signal and apply a despreading signal to generate a plurality of correlation output signals;
a first plurality of weight multipliers, each of which is coupled to one correlation output signal and one weight signal from the first vector of weight signals ($\vec{w}(q)$) and generates a weight multiplier output;
first adder that combines the plurality of weight multiplier outputs from the first plurality of weight multipliers to generate a first consecutive decision variable
a second plurality of weight multipliers, each of which is coupled to one correlation output signal and one weight signal from the second vector of weight signals ($\vec{w}(q')$) and generates a weight multiplier output; and
a second adder that combines the plurality of weight multiplier outputs from the second plurality of weight multipliers to generate a second consecutive decision variable.

12. A method of optimizing a signal-to-noise ratio in a decision variable output of an Adaptive Generalized Matched Filter (AGMF) rake receiver system, comprising the steps of:
providing a rake receiver that applies a vector of weight signals ($\vec{w}$) to a spread spectrum input signal to compensate for multi-user interference and generates a decision variable output;
providing a Code Division Multiple Access (CDMA) processing module that monitors the decision variable output and generates the vector of weight signals as a function of a scalar parameter ($r_o$);
setting the scalar parameter to a first value;
generating a first vector of weight signals ($\vec{w}(q)$) using the first scalar parameter value;
generating a first a decision variable output using the CDMA processing module according to the first vector of weight signals ($\vec{w}(q)$);
calculating a first signal-to-noise ratio of the first decision variable output;
setting the scalar parameter to a second value;
generating a second vector of weight signals ($\vec{w}(q')$) using the second scalar parameter value;
generating a second decision variable output using the CDMA processing module according to the second vector of weight signals ($\vec{w}(q')$);
calculating a second signal-to-noise ratio of the second decision variable output; and
if the second signal-to-noise ratio is greater than the first signal-to-noise ratio, then setting the first scalar parameter value to the second scalar parameter value.

13. A method of determining a vector of weight signals ($\vec{w}$) for optimizing a spread spectrum signal rake receiver in a mobile communication device, comprising the steps of:
receiving a spread spectrum signal;
determining a vector of channel impulse response signals ($\vec{h}$) from the spread spectrum signal;
providing an independent noise covariance matrix ($R_{IAN}$) stored in a memory location on the mobile communication device;

monitoring the vector of channel impulse response signals ($\vec{h}$) to determine a dependent noise covariance matrix ($R_{MUI}$);

determining a total noise covariance matrix (Ru) as a function of the independent noise covariance matrix ($R_{IAN}$), the dependent noise covariance matrix ($R_{MUI}$) and a scalar parameter ($r_o$); and determining the vector of weight signals ($\vec{w}$) from the total noise covariance matrix (Ru) and the vector of channel impulse response signals ($\vec{h}$).

14. The method of claim 13, wherein the total noise covariance matrix (Ru) is calculated using the equation $R_u = r_o R_{MUI} + (1-r_o) R_{IAN}$.

15. The method of claim 13, wherein the vector of weight signals ($\vec{w}$) is calculated using the equation $\vec{w} = R_u^{-1} \vec{h}$.

16. The method of claim 13, wherein the scalar parameter ($r_o$) is calculated as a function of a feedback signal from the spread spectrum signal rake receiver.

17. The method of claim 16, wherein the feedback signal is the signal to noise ratio of a decision variable output from the spread spectrum signal rake receiver.

18. The method of claim 16, wherein the feedback signal is a bit error rate of a decision variable output from the spread spectrum signal rake receiver.

19. The method of claim 13, wherein the scalar parameter ($r_o$) is in the range $0 \leq r_0 \leq 1$.

20. The method of claim 13, wherein the scalar parameter ($r_o$) is calculated using a one dimensional search algorithm that identifies an optimal value for a feedback signal from the spread spectrum signal rake receiver.

* * * * *